R. A. OGLE.
HOISTING MACHINE.
APPLICATION FILED DEC. 6, 1909.

963,384.

Patented July 5, 1910.
2 SHEETS—SHEET 5.

Fig. 5.

Witnesses:
John Enders
Chas. H. Buell

Inventor:
Robert A. Ogle.
By Dyrenforth, Lee, Chritton & Wiles
Attys.

R. A. OGLE.
HOISTING MACHINE.
APPLICATION FILED DEC. 6, 1909.

963,384.

Patented July 5, 1910.
8 SHEETS—SHEET 6.

Fig. 6.

Witnesses:
John Enders
Chas. H. Buell

Inventor
Robert A. Ogle.
By Dyrenforth, Lee, Chritton & Wiles
Attys

R. A. OGLE.
HOISTING MACHINE.
APPLICATION FILED DEC. 6, 1909.

963,384.

Patented July 5, 1910.
3 SHEETS—SHEET 3.

Witnesses:
John Enders
Chas. H. Buell

Inventor
Robert A. Ogle.
By Dyrenforth, Lee, Chritton & Wiles
Attys.

UNITED STATES PATENT OFFICE.

ROBERT A. OGLE, OF CHICAGO, ILLINOIS.

HOISTING-MACHINE.

963,384.　　　　Specification of Letters Patent.　　Patented July 5, 1910.

Application filed December 6, 1909. Serial No. 531,633.

*To all whom it may concern:*

Be it known that I, ROBERT A. OGLE, a citizen of the United States, residing at Chicago, in the county of Cook and State of Illinois, have invented a new and useful Improvement in Hoisting-Machines, of which the following is a specification.

My invention relates to improvements in machines for general hoisting purposes; and my objects are to provide means for the stopping automatically of the operation of the hoist for preventing the dropping of the load operated thereby, in the event of impairment of the hoist as by the breaking of parts thereof, or the sudden shutting off of the power; to provide means, preferably adjustable, and operating automatically to limit the operation of the machine in either or both directions of its movement for controlling the travel of the cable as desired; and generally to so improve machines of this type, as hitherto constructed, as to render them better adapted for their use, safer in operation, less liable to impairment, and as fully independent of manual control as possible.

As my invention has particular application to a hoist for operating a pair of carriers, whether such carriers be in the form of lifts, buckets, or other suitable movable supports, simultaneously and in opposite directions, I have chosen to illustrate it in this connection in the accompanying drawings, with an apparatus of the double-bucket type, in which—

Figure 1:
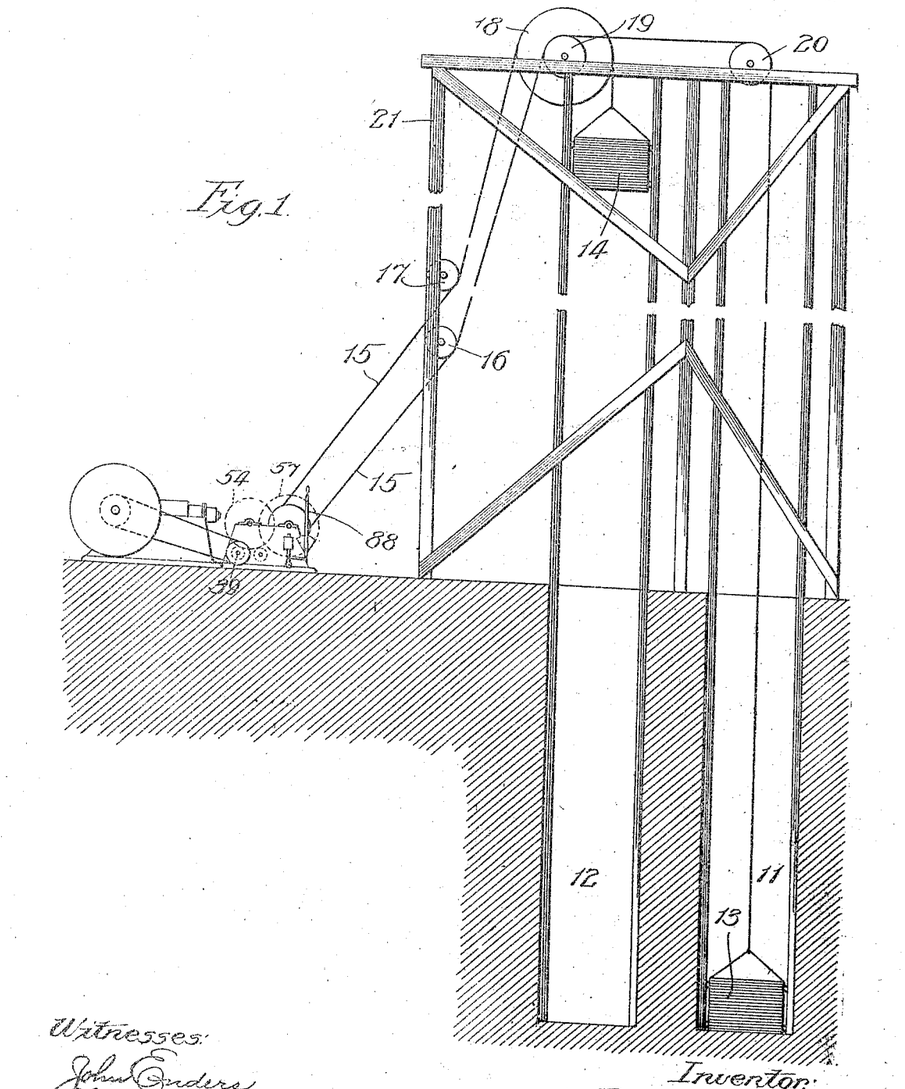
Figure 1 is a view in vertical elevation, and diagrammatic in its nature, of a double-bucket coaling-station operated by a hoist constructed in accordance with my invention.

In the diagrammatical illustration of the coal-station in Fig. 1, a pair of pits, represented at 11 and 12, serve to coöperate with coal-delivering means (not shown) for filling coal into buckets 13 and 14 supported from the ends of a cable 15 which extends over pulleys 16, 17, 18, 19 and 20 supported on the superstructure 21, and is wound about the drum of a hoist hereinafter described, the buckets 13 and 14 being so disposed with relation to these pits that when one is down in its coöperating pit for loading, the other is elevated to the dumping position, these buckets being designed to be operated simultaneously and in opposite directions, for alternate filling and dumping, by the hoist, in a manner well known in the art.

The frame of the hoist comprises two side-members 22 spaced apart, as represented, and provided at their upper end-portions with bearings 23 and 24 in which two shafts 25 and 26 extending transversely of the machine, are journaled. The shaft 26 carries at one end a car-puller 27 and intermediate its ends supports a drum 28 about which the cable 15 is wound, this drum being formed with an internal annular flange 29 terminating in a sleeve-extension 30 freely rotatable on the shaft 26 and carrying a sprocket wheel 31. The annular flange 29 has secured to it, as indicated at 32, a sleeve 33 forming one of the coöperating clutch-members of a clutch-device for gripping the drum 28 to the shaft 26, the other member of which is a sleeve 34 feathered to the shaft and movable longitudinally thereon into and out of clutching position through the medium of a lever 35 fulcrumed at its lower end as indicated at 36 to a stud 37 extending inwardly from the frame of the machine, and engaging intermediate its ends with the sleeve 34 as indicated at 38, in a manner well known in the art.

The drive-shaft represented at 39 is journaled in bearings 40 in the frame-sides 22 and carries toward its opposite ends pinions 41 and 42 which are freely rotatable thereon and are adapted to be alternately gripped to the shaft 39 by clutches 43 and 44, respectively, operating in a well known manner through the medium of a horizontal swinging bar 45 fulcrumed between its ends as indicated at 46 to a stationary sleeve 47 surrounding a shaft 48 journaled in bearings 49 in the frame-sides and held against longitudinal movement thereon by sleeves 50 rigid on the shaft 48. The bar 45 has a yoke-shaped head 51 which has slot and pin connection as indicated at 52 with a sliding sleeve 53, through the medium of which the clutches 43 and 44 are operated.

The shaft 25 carries at one end a gear 54 rigidly secured thereto and meshing with the pinion 41 and a pinion 55 fixed on the shaft 48, and at its opposite end a pinion 56 meshing with a gear 57 fixed on the shaft 26, the shaft 48 also carrying a pinion 58 secured thereto and meshing with the pinion 42. Thus, when the clutch 43 is thrown in, the pinions 42 and 58 operate idly and the gear 54 is driven from the pinion 41 direct for driving the shaft 26 and its drums in one direction, whereas when the clutch 44 is thrown in, the gear 54 is driven through the medium of the pinions 42, 58 and 55, thus reversing its direction of movement and that of the shaft 26 and the drums carried thereby.

The mechanisms for controlling the movement of the drum 28 in opposite directions and applying a brake to the drum in the event of the breaking of a part of the machine or the failure of power, which would allow the drum to run free, are automatic in operation and their construction is as follows: Journaled in bearings 59 provided in brackets 60 on the frame-sides, is a shaft 61 carrying a yoke-shaped depending arm 62 pivotally connected with a link 63, the forward end of the latter having pivotal connection as indicated at 64 with one end of a bell-crank lever 65 fulcrumed at its angle, as indicated at 66, to a bracket 67 on the adjacent frame-side, and pivotally connected at its other arm, as indicated at 68, with an end of the bar 45 through the medium of a link 69, whereby rocking the shaft 61 in opposite directions alternately moves the clutches 43 and 44 into operative position. Rotatably mounted on the shaft 61 is a yoke-shaped frame 70, the sides of which contain longitudinally extending slots 71 which serve as guides for the ends 72 of a pawl-device 73 having screw-threaded connection with a threaded portion 74 of the shaft 61 within the confines of the frame 70. The frame 70 is rigid with a sprocket wheel 75 connected by a chain 76 with the sprocket 31, whereby in the rotation of the drum 28, the yoke 70 and pawl-device 73 are rotated and the latter is carried along the shaft 61 by reason of its threaded connection therewith to the right or left in Fig. 3, depending on the direction in which the drum 28 is rotated. The pawl-device 73 is formed on its opposite faces with oppositely-disposed shoulders 77 and 78 which are adapted to alternately engage with shoulders 79 and 80, respectively, formed on dogs 81 and 82 rigidly secured to the shaft 61, but adjustable lengthwise thereon by the clamping-means 83, whereby engagement of the shoulders 77 and 78 with their respective coöperating shoulders 79 and 80 operate to rock the shaft 61 for moving the drive-shaft clutch-mechanism to normal inoperative and neutral position for stopping the machine, as is hereinafter more fully explained. Fixed on one end of the shaft 61 is a sleeve 84 terminating in an upright-extending segmental plate 85 provided in its periphery with a notch 86, and fulcrumed on the shaft between the plate 85 and a sleeve 87, is a lever 88 provided above the shaft 61 with a spring-pressed pawl 89 adapted to extend, under the action of its spring 90, into the notch 86 and be withdrawable therefrom by operating a lever 91 fulcrumed to the lever 88, as indicated at 92, and connected with the pawl 89 through the medium of a link 93. The lower end of the lever 88 is pivotally connected with one end of a link 94, the opposite end of which is pivotally connected with an upright arm 95, intermediate the ends of the latter, the arm 95 being fixed at its lower end on a rock-shaft 96 journaled in the frame-sides and preferably carrying at its upper end a weight 97 adjustable thereon through the medium of the set-screw 98, the normal and neutral position of the weight and arm 95, namely when the shaft 26 is at rest, being that illustrated in Fig. 2. One end of the drum 28 is formed with a peripheral channel 99, and fixed on the shaft 96 immediately below this channel is an upright yoke-shaped member 100 in the arms of which a pin 101 is secured, this pin extending through the eye-equipped ends 102 of a brake-strap 103 formed with a turn-buckle section 104 and, looped about the drum 28 at its channel 99, the connection thus afforded between the member 100 and the ends of the strap 103 being pivotal. The inner surface of the strap 103 is provided with friction blocks 105 of wood, or any other suitable material, spaced apart and extending into the channel 99, the turn-buckle 104 being so adjusted as to cause the band-brake formed of the strap 103 and blocks 105 to extend loosely about the drum 28 when the shaft 26 is at rest, as illustrated in somewhat exaggerated condition in Fig. 7, but be in position for gripping the drum 28 in case of accident effecting reversal thereof, as is hereinafter more fully explained.

Figure 8:
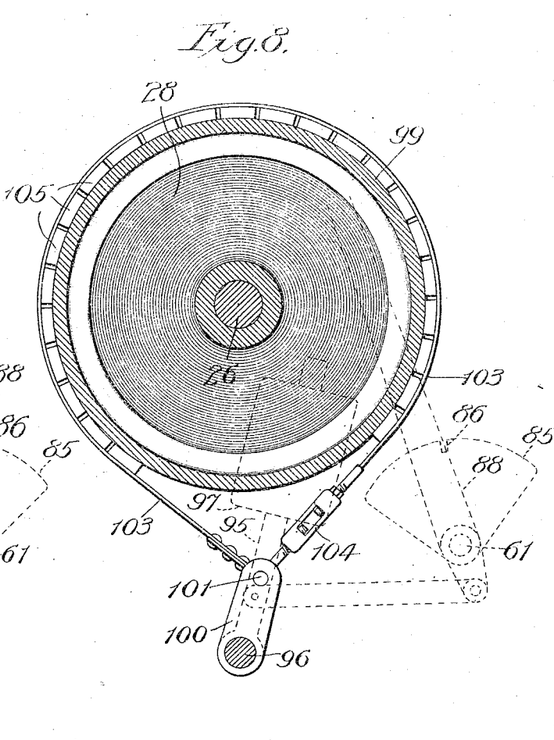
Fig. 8 is a view like that of Fig. 7 showing the brake mechanism in one of the positions it assumes during the operation of the machine.
Figure 9:
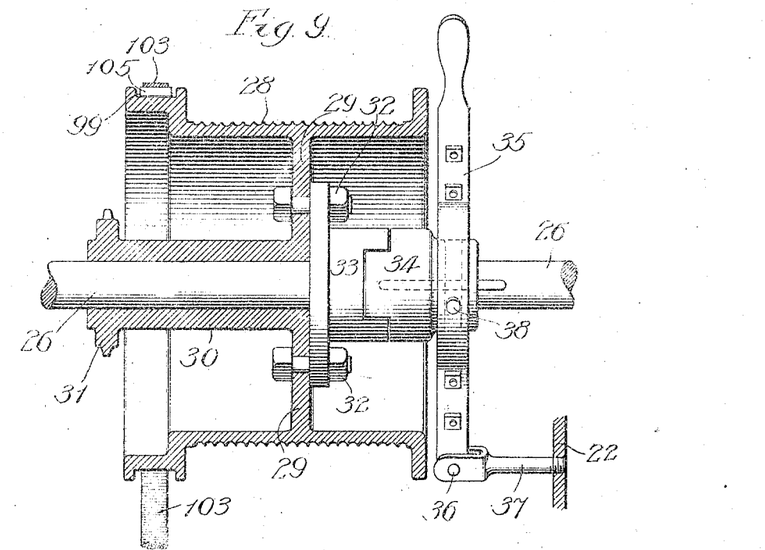
Fig. 9 is a section taken at the line 9 on Fig. 5 and viewed in the direction of the arrow.
Figure 10:
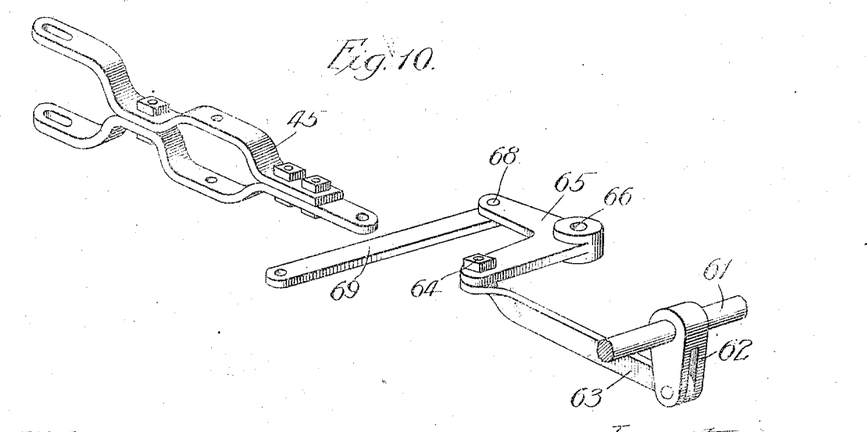
Fig. 10, a perspective view of the lever mechanism, shown partly disassembled but in relative positions, for operating the clutches which control the operation of the hoist.

The operation of the apparatus is as follows: Assuming that the buckets 13 and 14 are in the positions illustrated in Fig. 1, the lowermost bucket 13 filled ready to be raised and the drum 28 clutched to the shaft 26 as hereinbefore described, it being understood that if desired this drum may be permanently secured on its supporting-shaft, the operator to hoist the bucket 13 and lower the bucket 14 swings the lever 88 at its upper end to the left in Fig. 2, thus swinging the segmental plate 85 and the shaft 61 connected therewith likewise to the left with the result of swinging the arm 62 to the right, and through the medium of the links 63 and 69 swinging the lever 65 and bar 45, to throw in the clutch 43 for gripping the pinion 41 to the drive-shaft 39. The effect of so operating the clutch 43 is to cause the drum 28 to rotate to the right in Fig. 2 through the medium of the pinions 41 and 56, and the gears 54 and 57 for winding the cable on the drum 28 in a direction for raising the bucket 13 and lowering the bucket 14. The shaft 26 in rotating as described serves to rotate the yoke 70 and pawl-device 73 to the right in Fig. 2, this pawl-device in rotating upon the shaft 61 traveling from left to right in Fig. 3 until its shoulder 78 engages with the shoulder 80 rigid with the shaft 61, whereupon the latter is caused to be rocked in its bearings, and with it the plate 85, to normal or neutral position, thus swinging the arm 45 and the clutch-member 43 to normal position through the medium of the intermediate links and levers 63, 65 and 69, whereupon the machine stops with the bucket 13 in a dumping position and the bucket 14 in position for loading. After swinging the lever 88 to the left in Fig. 2 as described for starting the machine, the operator withdraws the pawl 89 from the notch 86 by operating the lever 91, thus disengaging the lever 88 from the plate 85. The lever 88 in being operated to swing the plate 85 to the left as hereinbefore described, causes the arm 95 to swing to the right in Fig. 2 and rocks the shaft 96 and the member 100 supported thereon in a corresponding direction, and when the lever 88 is disengaged from the plate 85 as described the shaft 96 is free to be rocked further by the action of the weight 97 thus thrown to the right, off-center, in Fig. 2 to a position in which the band-brake grips the bottom of the drum-channel 99 as illustrated in Fig. 8. As hereinbefore stated, the drum 28 rotates to the right in Figs. 2 and 8 against the weight of the loaded bucket 13 in rising and thus the tendency of the drum in operating against the band-brake is to constantly loosen it, whereby no interference with the operation of the drum 28 occurs so long as the latter rotates to the right in Fig. 8. Should, however, the machine become impaired in such a way as to permit the shaft 26 to run free and thus permit the loaded bucket to drop, as for instance by breaking of a part of the machine or of cessation of power in the engine, the drum 28 instead of rotating to the right in Fig. 8 would run to the left in this figure with the result of automatically pulling on the band-brake and thus setting it and preventing the drum 28 from turning.

Figure 2:
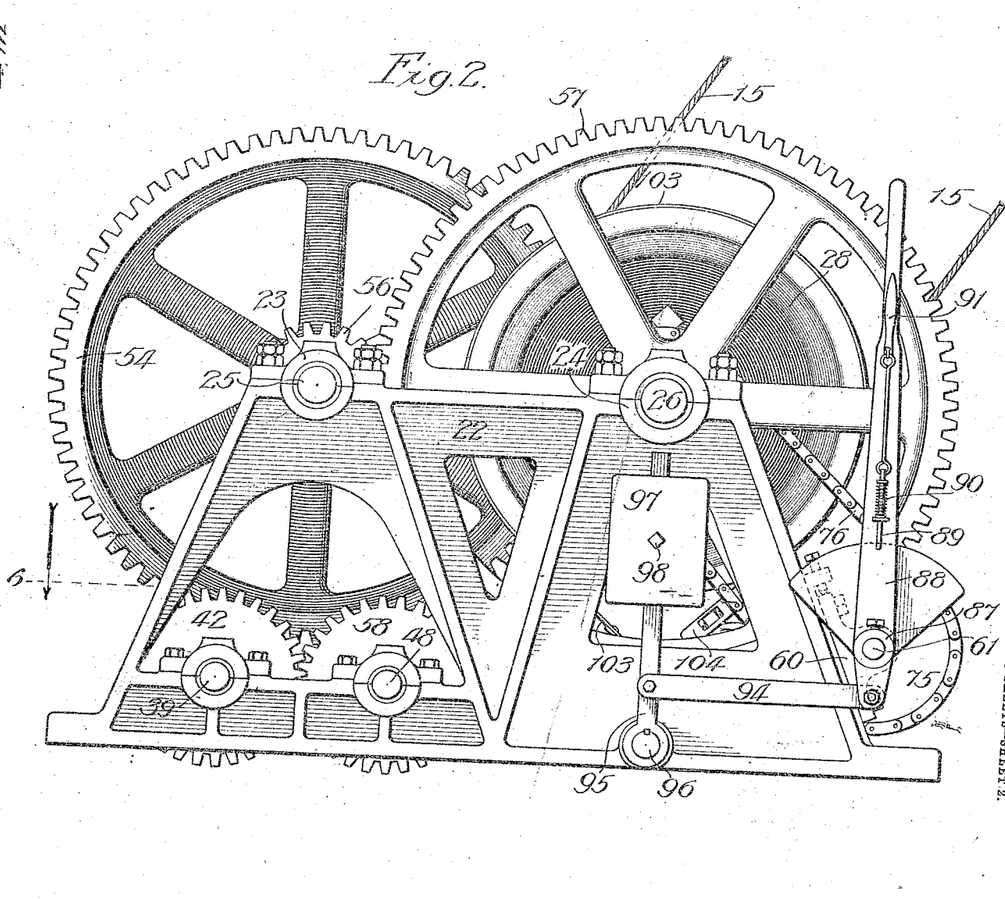
Fig. 2 is a view in side elevation of the hoist.
Figure 3:
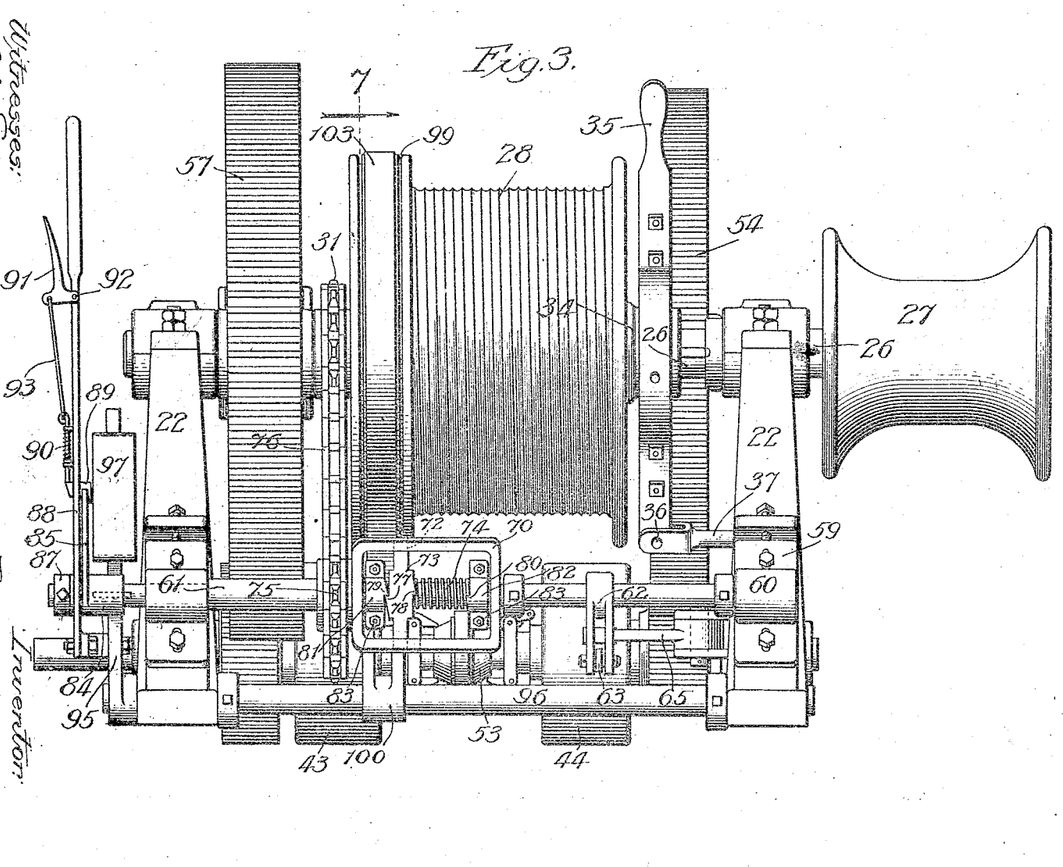
Fig. 3 is a view in end elevation thereof.
Figure 4:
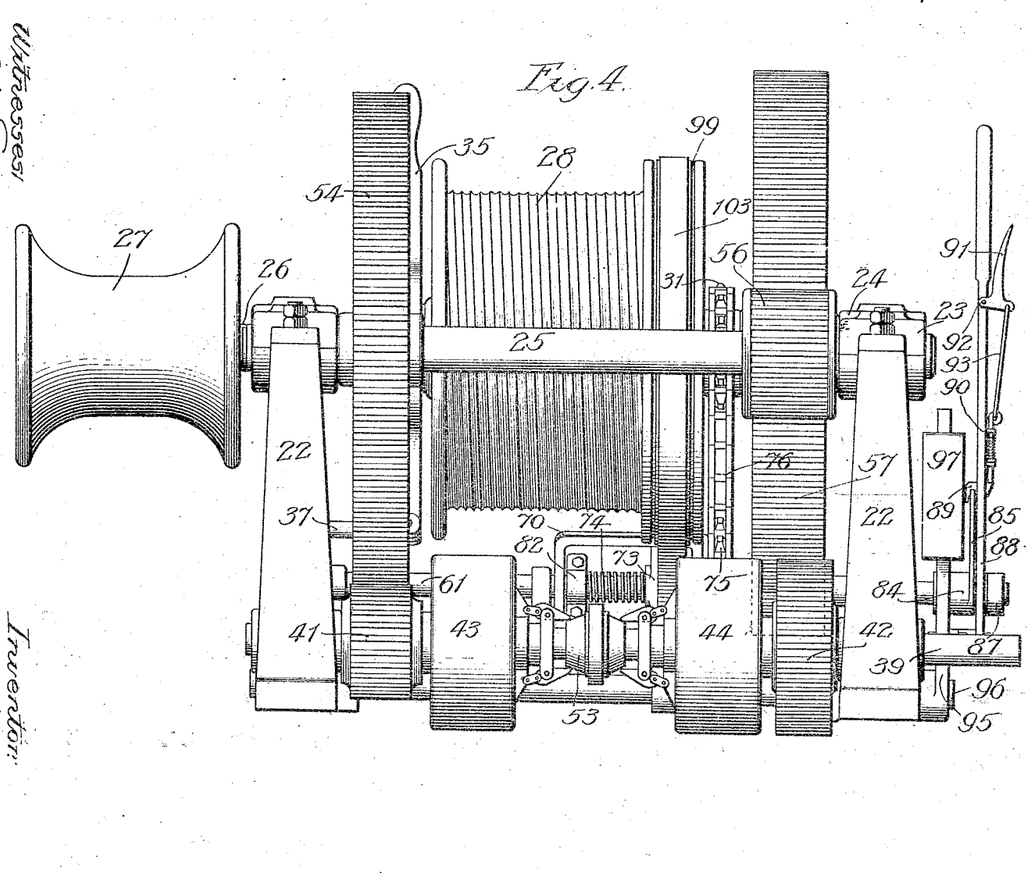
Fig. 4 is a similar view from the other end of the hoist.
Figure 5:
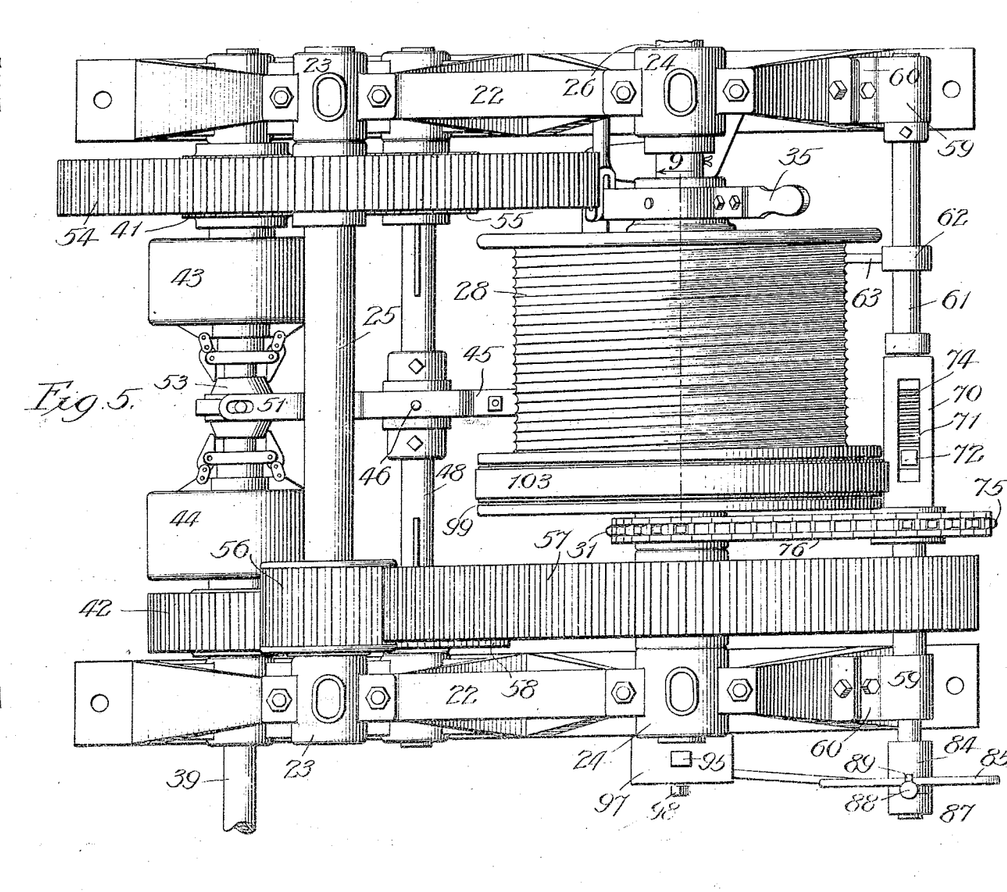
Fig. 5 is a plan view thereof.
Figure 6:
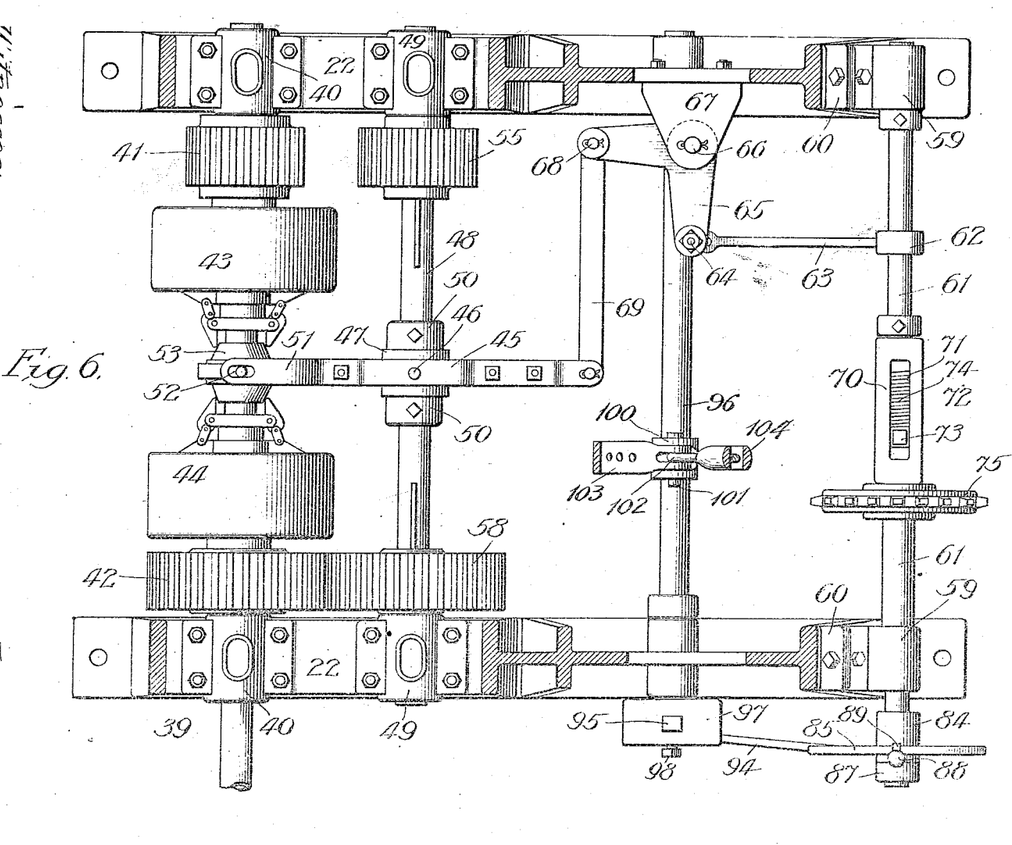
Fig. 6 is a section taken at the line 6 on Fig. 2 and viewed in the direction of the arrow.
Figure 7:
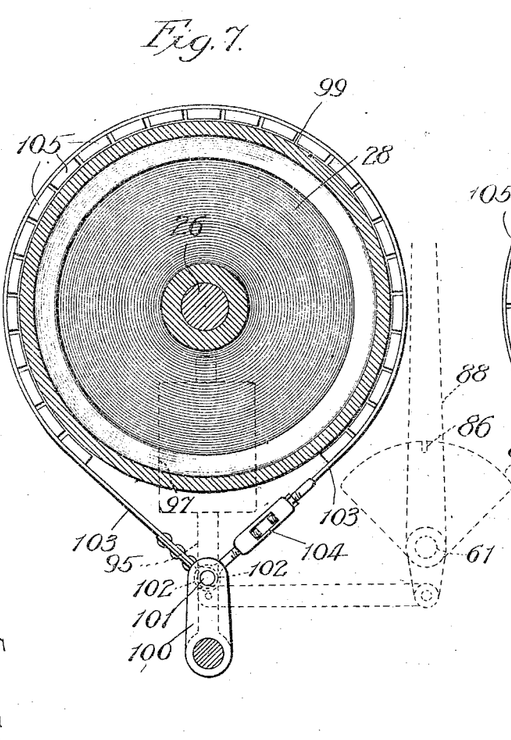
Fig. 7 is a section taken at the line 7 on Fig. 3 and viewed in the direction of the arrow, this view showing the brake mechanism of the hoist in normal and neutral position.

After the machine has stopped by reason of the engagement of the shoulders 78 and 80, the operator, to reverse the movement of the drum 28 for lowering the empty bucket 13 and raising the filled bucket 14, swings the lever from the position it occupies in Fig. 8, to upright position in which its pawl 89 springs into the notch 86, and thereupon swings the lever 88 and with it the plate 85 and shaft 61 to the right in Figs. 2 and 7 with the result of throwing in the clutch 44 and causing the drum 28 to be operated to the left in Fig. 2 through the medium of the pinions 42, 58, 55 and 56, and the gears 54 and 57, thus permitting the cable 15 to wind upon the drum 28 in the direction opposite to that just described for lowering the bucket 13 and raising the bucket 14. The effect of thus operating the drum is to rotate the yoke 70 and its pawl-device 73 to the left in Fig. 2, thus causing this pawl-device to travel on the screw 74 to a position in which it engages at its shoulder 77 with the shoulder 79, whereupon the shaft 61 is returned to normal neutral position and the clutch 44 withdrawn to normal inoperative position for stopping the machine, the engagement of the shoulders 77 and 79 occurring when the buckets have reached the limit of their movements.

By swinging the lever 88 to the right in Fig. 7 from its normal position, as described, it throws the arm 95, shaft 96 and member 100 likewise from their normal positions to the left in this figure, the operator thereupon releasing the pawl 89 from the notch 86 with the result of permitting the lever 88 to swing still farther to the right in this figure under the action of the weight 97, thus drawing the band-brake against the drum 28 under the tension of the weight 97, but as the drum rotates to the left in this figure it tends to pull the brake out of gripping engagement with the drum. Should, however, any accident occur which would permit the drum to run free in the opposite direction under the pull exerted on the cable 15 by the loaded bucket, the band-brake would immediately automatically operate to grip the drum 28 and hold it stationary with the loaded bucket suspended from the cable.

From the foregoing it will be noted that the lever 88 while moving from neutral, normal position in engagement with the plate 85 in either direction, operates as a clutch-lever and, when disengaged from the plate, operates to position the brake for effecting its actuation upon reversal of the drum under the weight of the load, thus serving as a brake-lever.

While my invention is illustrated and described as embodied in a hoist apparatus where a pair of buckets moving in opposite directions are employed, I do not wish to be understood as intending to limit my invention to its use in this connection, as it may be incorporated in a single bucket system to advantage. Where a single bucket is employed and it is desired to employ the automatically operated mechanisms hereinbefore referred to, it is desirable that the end of the cable 15 which is not connected with a bucket, carry a counterweight which is heavier than the empty bucket carried on the other end of the cable, the operation of this apparatus being the same as that described of the particular construction shown. Where such counterweighting is not desirable, the preferred way of operating the single bucket would be that described for raising the bucket 13 while loaded and lowering the bucket 14 for filling. As the hoist in a non-counterweighted single bucket construction would have no weight to lift as the bucket descends, power need not be applied to the drum through the drive-shaft, but the operator may by manually operating the lever 88 from its position shown in Fig. 8 allow the drum to rotate against the brake under the pull exerted thereon through the cable to which the descending bucket is attached, the brake in this instance being manually controllable during the descent of the bucket.

It will be noted from the foregoing that by adjusting the shouldered dogs 81 and 82 on the shaft 61 to different positions, the buckets 13 and 14 may be caused to travel through paths of varying lengths as conditions require and be automatically stopped in their movement at any desired position by engagement of the pawl-device 73 with the shoulders on these dogs. It will also be noted that the control of the hoist is effected through a single lever, and that there is no possibility of an operator throwing the lever in the wrong direction, in starting the machine, as it is always locked, when the machine is at rest, against movement in any but the right direction for properly operating the hoisting mechanism, this being a feature of great advantage, as it affords an effective safeguard not only to the apparatus of which it forms a part but also to workmen employed about it. Furthermore, my invention is not limited in its use to hoisting apparatus of this general type, as it may be utilized in any other types of apparatus, such as, for instance, lifts, where the features of my invention may be incorporated and used to advantage, such other uses being within the spirit of my invention.

What I claim as new and desire to secure by Letters Patent, is—

1. In mechanism of the character set forth, the combination of a drive-member, a driven-member operated from said drive-member against the weight of a load, a band-brake coöperating with said driven-member, and a shiftable member connected with the ends of said brake and operating when shifted to move said brake into and out of a position in which it grips said driven-member to prevent the rotation of the latter in the opposite direction under the weight of the load.

2. In mechanism of the character set forth, the combination of a drive-member, a driven-member operated from said drive-member against the weight of a load, a pivoted member, and a band-brake surrounding said driven-member and connected at its ends with one end of said pivoted member, the whole being constructed and arranged to cause the brake to be in a position for gripping the driven-member to stop its rotation in the opposite direction under the weight of the load when the connection between said pivoted member and brake is out of line with the axes upon which the driven-member and pivoted member turn.

3. In mechanism of the character set forth, the combination of a drive-member, a driven-member operated from said drive-member against the weight of a load, means for controlling the actuation of said driven-member by said drive-member, a shiftable band-brake coöperating with said driven-member and operating automatically when shifted to prevent said driven-member from rotating in the opposite direction under the weight of the load, a rock-member, means operated by said rock-member for operating said first-named means, and lever mechanism for shifting said brake and said rock-member releasably connected with the latter, for the purpose set forth.

4. In mechanism of the character set forth, the combination of a drive-member, a driven-member operated from said drive-member against the weight of a load, means for controlling the actuation of said driven-member by said drive-member, a shiftable band-brake coöperating with said driven-member and operating automatically when shifted to prevent said driven-member from rotating in the opposite direction under the weight of the load, a rock-member, means operated by said rock-member for operating said first-named means, means for returning said rock-member to normal position for disengaging the driven-member from said drive-member, and a lever for shifting said brake and rock-member releasably connected with the latter, for the purpose set forth.

5. In mechanism of the character set forth, the combination of a drive-member, a driven-member operated from said drive-member against the weight of a load, means for controlling the actuation of said driven-member by said drive-member, a shiftable band-brake coöperating with said driven-member and operating automatically when shifted to prevent said driven-member from rotating in the opposite direction under the weight of the load, a rock-shaft, means operated by said rock-shaft for operating said first-named means, a lever journaled on said shaft and releasably connected therewith, and means operated by said lever for shifting said brake, for the purpose set forth.

6. In mechanism of the character set forth, the combination of a drive-member, a driven-member operated from said drive-member against the weight of a load, means for controlling the actuation of said driven-member by said drive-member, a shiftable band-brake coöperating with said driven-member and operating automatically when shifted to prevent said driven-member from rotating in the opposite direction under the weight of the load, a rock-shaft, means operated by said shaft for operating said first-named means, a segmental plate rigid with said rock-shaft, a lever journaled on said shaft and having releasable connection with said segmental plate, and means operated by said lever for shifting said brake, for the purpose set forth.

7. In mechanism of the character set forth, the combination of a drive-member, a driven-member operated from said drive-member against the weight of a load, means for controlling the actuation of said driven-member by said drive-member, a shiftable band-brake coöperating with said driven-member and operating automatically when shifted to prevent said driven-member from rotating in the opposite direction under the weight of the load, a rock-shaft, means operated by said shaft for operating said first-named means, a segmental plate rigid with said rock-shaft and containing a notch in its periphery, a lever journaled on said shaft, a spring pawl on said lever adapted to releasably engage with the notch in said plate, and means operated by said lever for shifting said brake, for the purpose set forth.

8. In mechanism of the character set forth, the combination of a drive-member, a driven-member operated from said drive-member against the action of a load, means for controlling the actuation of said driven-member by said drive-member, a shiftable band-brake coöperating with said driven-member and operating automatically when shifted to prevent said driven-member from rotating in the opposite direction under the weight of the load, a rock-shaft, means operated by said shaft for operating said first-named means, a segmental plate rigid with said rock-shaft and containing a notch in its periphery, a lever journaled on said shaft, a spring pawl carried by said lever and adapted to releasably engage with the notch in said plate, and weighted lever mechanism operated by said lever for shifting said brake, for the purpose set forth.

9. In mechanism of the character set forth, the combination of a drive-member, a driven-member, means operated by said drive-member for operating said driven-member in opposite directions in opposition to a load, and band-brake mechanism coöperating with said driven-member and operating automatically to stop said driven-member in its rotation in either direction when reversely rotated under the weight of the load.

10. In mechanism of the character set forth, the combination of a drive-member, a driven-member, means operated by said drive-member for operating said driven-member in opposite directions in opposition to a load, a shiftable band-brake coöperating with said driven-member and operating automatically, when shifted in opposite directions, to stop said driven-member in its rotation in either direction when reversely rotated under the weight of the load.

11. In mechanism of the character set forth, the combination of a drive-member, a driven-member, means operated by said drive-member for operating said driven-member in opposite directions in opposition to a load, a band-brake, and a movable member to which said band-brake is connected operating when moved in opposite directions to position the brake for stopping the said driven-member in either direction of movement, when reversely rotated, under the action of said load.

12. In mechanism of the character set forth, the combination of a drive-member, a driven-member, means operated by said drive-member for operating said driven-member in opposite directions in opposition to a load, a band-brake, a rock-shaft, an arm connected with said rock-shaft and with said band-brake and operating when actuated in opposite directions to shift the brake and move its connection with said arm out of alinement with the axes of said driven member and rock-shaft from one side to the other, for the purpose set forth.

13. In mechanism of the character set forth, the combination of a drive-shaft, a drum, means operated by said drive-shaft for operating said drum in opposite directions, and a band-brake surrounding said drum and operating automatically to stop said drum in its rotation in either direction when reversely rotated under the weight of the load.

14. In mechanism of the character set forth, the combination of a drive-member, a driven-member driven in opposite directions from said drive-member in opposition to a load, means for controlling the actuation of said driven-member by said drive-member, braking means for said driven-member operating automatically to stop the rotation of said driven-member in either direction when reversely rotated under the weight of the load, and means connected with said braking means and having releasable connection with said first-named means for actuating the latter for rotating said driven-member and moving said braking means to position for braking.

15. In mechanism of the character set forth, the combination of a drive-member, a driven-member driven in opposite directions from said drive-member in opposition to a load, means for controlling the actuation of said driven-member by said drive-member, braking means for said driven-member operating automatically to stop the rotation of said driven-member in either direction when reversely rotated under the weight of the load, and a lever connected with said braking means and releasably connected with said first-named means for actuating the latter for rotating the drum and moving braking means into position for braking.

16. In mechanism of the character set forth, the combination of a drive-member, a driven-member driven in opposite direction from said drive-member in opposition to a load, means for controlling the actuation of said driven-member by said drive-member, braking means for said driven-member operating automatically to stop the rotation of said driven-member in either direction when reversely rotated under the weight of the load, means operating automatically to actuate said first-named means for stopping said driven-member in its rotation after it has rotated a predetermined number of times, and means connected with said braking means and having releasable connection with said first-named means for actuating the latter to rotate the driven-member and move said braking means into position for braking, for the purpose set forth.

17. In mechanism of the character set forth, the combination of a drive-member, a driven-member driven in opposite directions from said drive-member in opposition to a load, a rock-shaft, means connected with said shaft for controlling the actuation of said driven-member by said drive-member, a band-brake coöperating with said driven-member and operating automatically to stop the driven-member in its rotation in either direction when reversely rotated by the weight of the load, and a lever on said shaft connected with said brake and having releasable connection with said first-named means, for the purpose set forth.

18. In mechanism of the character set forth, the combination of a cable-driving drum, a drive-shaft, gear-mechanisms interposed between said drive-shaft and drum, a pair of clutches adapted to alternately engage with said shaft to alternately actuate said gear-mechanisms for driving the drum in opposite directions, a rocking-member, means operated by said rocking-member in its movements in opposite directions for alternately throwing in said clutches, and means operating automatically to move said rocking-member to a position in which both clutches shall be out of operative position, for the purpose set forth.

19. In mechanism of the character set forth, the combination of a cable-driving drum, a drive-shaft, gear mechanisms interposed between said drive-shaft and drum, a pair of clutches adapted to alternately engage with said shaft to alternately actuate said gear mechanisms for driving the drum in opposite directions, a rock-shaft provided with a crank-arm, a bell-crank lever fulcrumed upon the machine, a link connected with said crank-arm and one of the arms of said bell-crank, and lever mechanism connected with the other arm of said bell-crank and with said clutches for alternately throwing in the latter when said rock-shaft is operated in opposite directions, a rotatable device operating during the rotation of the drum and movable longitudinally of said rock-shaft in opposite directions, and means connected with said rock-shaft and coöperating with said rotatable device for engaging with the latter in its movements in opposite directions to return said rock-shaft to normal position, in which both clutches shall be out of operative position, for the purpose set forth.

20. In mechanism of the character set forth, the combination of a cable-driving drum, a drive-shaft, gear mechanisms interposed between said drive-shaft and drum, a pair of clutches adapted to alternately engage with said shaft to alternately actuate said gear mechanisms for driving the drum in opposite directions, a rock-shaft provided with a crank-arm, a bell-crank lever fulcrumed on the machine, a link connected with one arm of said bell-crank lever and with said crank, a lever fulcrumed on the machine between its ends and operatively engaging at one end with said clutches, a link connecting the other end of said clutch-engaging lever with the other end of said bell-crank lever, a rotatable device operating during the rotation of the drum and movable longitudinally of said rock-shaft in opposite directions, and means connected with said rock-shaft and coöperating with said rotatable device for engaging with the latter in its movements in opposite directions to return said rock-shaft to normal position, in which both clutches shall be out of operative position, for the purpose set forth.

21. In mechanism of the character set forth, the combination of a cable-driving drum, a drive-shaft, gear mechanisms interposed between said drive-shaft and drum, a pair of clutches adapted to alternately engage with said shaft to alternately actuate said gear mechanisms for driving the drum in opposite directions, a rock-shaft provided with a crank-arm, a bell-crank lever fulcrumed on the machine, a link connected with one end of said bell-crank lever and with said crank, lever-mechanism connected with the other end of said bell-crank lever and operatively engaging with said clutches for alternately throwing them in when said rock-shaft is operated, a rotatable device operating during the rotation of the drum and movable longitudinally of said rock shaft in opposite directions and provided on its opposed sides with shoulders, and shouldered members on said rock-shaft on opposite sides of said rotatable device adapted to coöperate with the shoulders on said rotatable device and alternately engage therewith for returning said rock-shaft to normal position in which both clutches shall be out of operative position, for the purpose set forth.

22. In mechanism of the character set forth, the combination of a rotary member, means for operating said rotary member against the weight of a load, a shiftable brake-band coöperating with said rotary member and operating automatically when shifted to prevent said rotary member from rotating in the opposite direction under the weight of the load, means for controlling the operation of said rotary member against the weight of the load, and means for operating said last-named means and shifting said brake-device to braking position, for the purpose set forth.

23. In mechanism of the character set forth, the combination of a rotary member, means operating to drive said member in opposite directions against the weight of a load, and band-brake mechanism coöperating with said rotary member and operating automatically to stop the latter in its rotation in either direction when reversely rotated under the weight of the load.

24. In mechanism of the character set forth, the combination of a rotary member, means operating to rotate said member in opposite directions against the weight of a load, means for controlling the operation of said member in opposite directions against the weight of the load, braking means for said rotary member operating automatically to stop the rotation of said member in either direction when reversely rotated under the weight of the load, and means connected with said braking means and releasably connected with said second-named means for operating the latter for actuating said rotary member and moving said braking means to position for braking.

25. In mechanism of the character set forth, the combination of a rotary member, means operating to rotate said member in opposite directions against the weight of a load, means for controlling the operation of said member in opposite directions against the weight of the load, braking means for said rotary member operating automatically to stop the rotation of said member in either direction when reversely rotated under the weight of the load, and a lever connected with said braking means and releasably connected with said second-named means for operating the latter for actuating said rotary member and moving said braking means to position for braking.

26. In mechanism of the character set forth, the combination of a rotary member, means for rotating said member against the weight of a load, a lever fulcrumed on the machine, means operated by said lever for controlling the actuation of said rotary member, and means operating automatically to stop said rotary member in its rotation when rotated in the opposite direction under the weight of the load and actuated by said lever to position it for braking, whereby said lever operates as a starting and brake-positioning device, for the purpose set forth.

27. In mechanism of the character set forth, the combination of a rotary member, means for rotating said member in opposite directions against the weight of a load, a lever fulcrumed on the machine, means operated by said lever for controlling the actuation of said rotary member, and means operating automatically to stop said rotary member in its rotation when rotated in either direction under the weight of the load and actuated by said lever to position it for braking, whereby said lever operates as a starting and brake-positioning device, for the purpose set forth.

28. In mechanism of the character set forth, the combination of a rotary member, means for driving said member in opposite directions against the weight of a load, means for controlling the actuation of said member in opposite directions, means operatively connected with said second-named means and operating automatically to actuate the latter for stopping the rotary member in its rotation in both directions, braking means operating automatically when actuated to stop the rotation of said rotary member in both directions when reversely rotated under the weight of the load, and means connected with said braking means and releasably connected with the other of said automatically-operating means for operating the latter to actuate said rotary member and operating said braking means to move them into braking position, for the purpose set forth.

ROBERT A. OGLE.

In presence of—
W. B. DAVIES,
R. A. SCHAEFER.